J. D. PUGH.
COAL MINING MACHINE.
APPLICATION FILED JUNE 30, 1915.
1,374,525.
Patented Apr. 12, 1921.
2 SHEETS—SHEET 2.
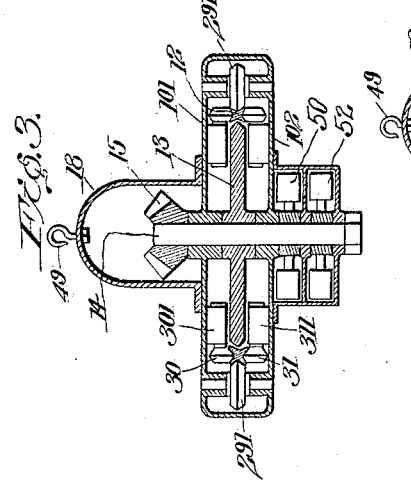
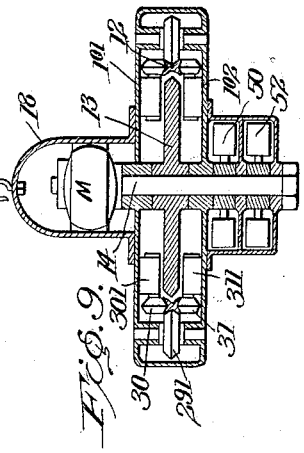
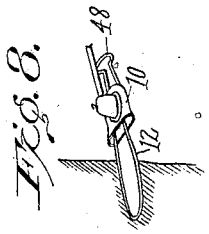
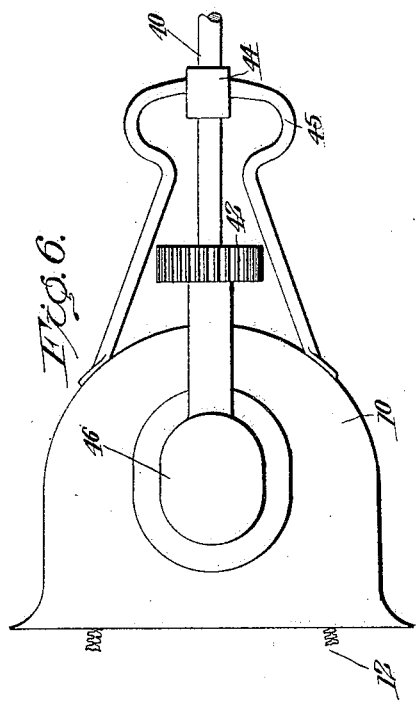
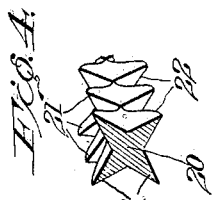
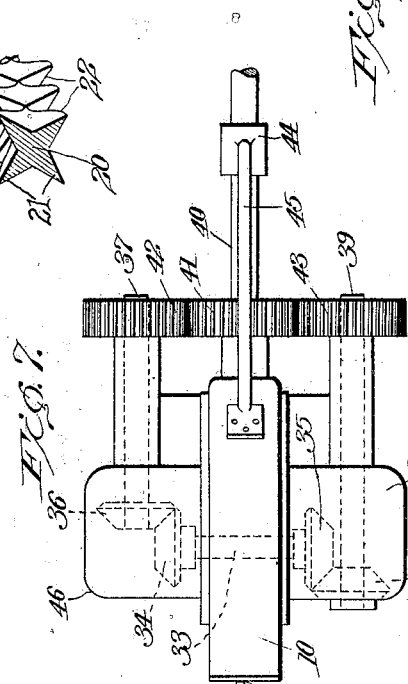
Witnesses
Inventor
John D. Pugh
by Foster Freeman Watson & Cert
Attorneys

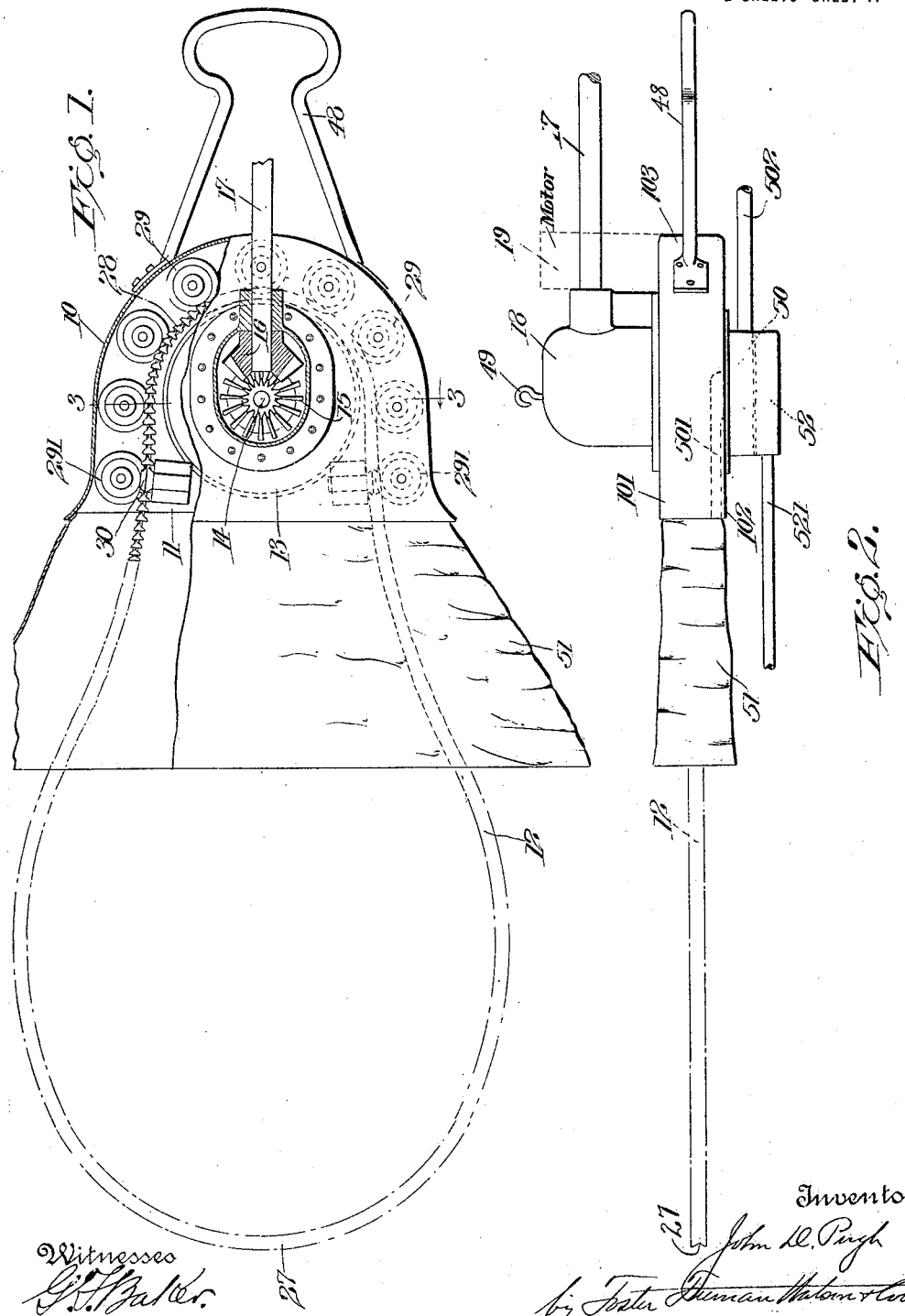

UNITED STATES PATENT OFFICE.

JOHN D. PUGH, OF HARRISBURG, PENNSYLVANIA.

COAL-MINING MACHINE.

1,374,525.     Specification of Letters Patent.     Patented Apr. 12, 1921.

Application filed June 30, 1915. Serial No. 37,265.

*To all whom it may concern:*

Be it known that I, JOHN D. PUGH, a citizen of the United States, residing at Harrisburg, Dauphin county, State of Pennsylvania, have invented certain new and useful Improvements in Coal-Mining Machines, of which the following is a specification.

This invention relates to a coal mining machine and while the machine described is primarily intended for cutting coal it can, with a suitable blade, be adapted to cut wood, steel or any other material.

The principal object of the invention is to provide a machine in which a flexible cutter in the form of an elongated loop is supported and driven from one end only, leaving the other end of the loop free and unsupported except through the cutter from the driven end thereof. The arrangement of a cutter in this form makes it possible, by tilting the cutter loop slightly, to cut a sharp V-shaped slot into a coal bank, which is very desirable in mining coal.

Another object is to provide a machine which is portable so that it can be easily moved from place to place and easily manipulated.

Another feature of the invention comprises the novel form of cutter which is capable of cutting in any one of several directions.

Another object of the invention is to provide means such as an exhaust fan for removing dust from the slot cut by the machine to a point away from the machine where it will not disturb the miner.

The invention also contemplates providing a pump on the machine by means of which water may be delivered to the cutter to lubricate and cool it, and to the slot in which the cutter works to keep down the dust and flow it out.

The above and other objects and the novel features of the invention will be apparent from the following description taken in connection with the drawing, in which, Figure 1 is a plan view of a machine embodying my invention, parts thereof being broken away to expose the interior of the hood and casing through which the cutter travels;

Fig. 2 is a side elevation of the machine shown in Fig. 1;

Fig. 3 is a cross sectional view of the machine taken on the line 3—3 of Fig. 1;

Fig. 4 is a perspective view of a type of cutter employed for mining coal;

Fig. 5 is a side view of part of another type of cutter and the wheel for driving it;

Figs. 6 and 7 are, respectively, a plan view and a side elevation of another form of machine embodying the invention;

Fig. 8 is a view showing the cut which the machine may make in the face of a coal bank, and Fig. 9 is a cross sectional view of a machine in which an electric motor is directly connected to the drive shaft of the machine.

Referring to the drawing, the numeral 10 designates a casing for the driving and guiding devices and consists of a shell having the top and bottom walls 101 and 102 and a curved rear wall 103 and having an open front end as at 11.

The machine has a flexible endless cutter 12 which is in the form of an elongated loop and is driven from one end only by a driving wheel 13 mounted on the shaft 14 and connected by bevel gears 15 and 16 to a power shaft 17. The upper end of the shaft 14 and the bevel gearing 15 and 16 is inclosed in a dust proof casing 18 mounted on the top wall 101 of the machine. The shaft 17 may be connected by a flexible shaft or other suitable means to a motor mounted on a truck (not shown) or the motor may be mounted directly on the machine as indicated at 19 in Fig. 2 in dotted lines, or the motor may be directly connected to the cutter, if preferred, without interposed gearings, as shown in Fig. 9.

Referring to Fig. 4, the cutter 12 has a central core 20 which forms the backbone or axis of the cutter and which is made of high grade spring tool steel or other suitable material. The cutter 12 is provided with cutting teeth 21 which are preferably formed integrally with the backbone 20 and arranged four in a group 90° from each other so that the cutter in cross section is star shaped. The backbone 20 may be constructed so that the teeth 21 may be inserted separately therein, but it is preferable to have the teeth an integral part of the backbone or core of the cutter. This arrangement of teeth is preferable because the cutter will be capable of acting in any direction with respect to the axis of the cutter, but I do not wish to be limited to the number, position or shape of the teeth. The inner side of the cutter or that surface which engages the surface of the driving wheel 13 has recesses 22 shaped to take the teeth on the peripheral surface of the wheel 13, although in some forms of cutter a friction drive may be preferable, in which case the wheel 13 would have no teeth thereon.

In Fig. 5 is illustrated a flat blade for cutting wood or other materials in two directions and consists of a core 23 with the teeth 24 and 25 on opposite sides thereof. This cutter frictionally engages the driving wheel 26 which corresponds to the wheel 13 of Fig. 1. This form of cutter is desirable for jig saw and cabinet makers' work.

The outer end 27 of the cutter 12 is free to assume approximately is natural shape, the cutter having sufficient inherent resiliency for this purpose. The inner end 28 of the elongated cutter 12 travels around the rear side of the wheel 13 through the casing 10 and is guided around the wheel 13 and held in contact therewith by means of a series of guide rollers 29 journaled in the top and bottom walls of the casing 10 and having their axes on a curve following the side wall 103 of the casing. The cutter 12 passes through the space between the wheel 13 and the guide rollers 29, being sprung back against the guide rollers and retained by them in contact with the wheel 13 so as to automatically follow it up as it wears.

Near the point where the cutter 12 enters and leaves the casing 10 are pairs of top and bottom guide rollers 30, 31, which are located opposite the end guide rollers 291. Referring to Fig. 3, the top and bottom guide rollers 30, 31 are mounted in bearings 301 and 311 on the top and bottom walls 101 and 102, respectively, of the casing and on opposite sides of the wheel 13. The end 28 of the elongated cutter 12 is therefore compelled to follow the wheel 13 so as to be positively driven thereby, and the driven end is rigidly supported, and, through the cutter 12, rigidly supports the outer, free end thereof which engages the material to be cut. No additional supporting means for the outer free end of the cutter are required since the cutter itself has sufficient inherent rigidity to support itself from its driven end.

The cutter 12 may, of course, be driven by worm gearing from the motor 19 or by any other form of driving mechanism which could be arranged in place of the bevel gearing 15, 16 or the wheel 13 may be connected direct to a motor shaft without interposed gearing.

Since the shaft 17 is located at one side of the center of the cutter 12 there will be a slight tendency for the machine to rotate about the axis of the shaft 17. In case this proves objectionable, the driving gearing may be arranged as shown in Figs. 6 and 7. In that arrangement, the shaft 33 to which the driving wheel 13 is connected projects from the top and bottom sides of the casing 10 and has the gears 34 and 35 mounted on the opposite ends thereof. A gear 36 on a shaft 37 meshes with the gear 34 and a gear 38 on the shaft 39 meshes with the gear 35, the gears 36 and 38 being positioned on opposite sides of the axis of the shaft 33 so that their direction of rotation will be correct. The main driving shaft 40 carries a gear 41 which meshes with the gears 42 and 43 on the shafts 37 and 39, respectively, and on opposite sides of the axis of the shaft 40. The shaft 40 is journaled at one end in the casing 10 and is also journaled in the box 44 at the center of the handle 45, connected to the casing 10 and by means of which the machine is manipulated. The pairs of gears 34, 36 and 35, 38 are inclosed within the casings 46 and 47 mounted on the top and bottom sides of the casing 10 to keep the dust from those gears.

The machine shown in Figs. 1, 2 and 3 is also provided with a handle 48 for manipulating the same and it is moved along the seam cut by the cutter 12; the machine may be suspended by a hook 49 from an overhead trolley extending along the front of the coal bank if desired.

The amount of bend and the extent of restraint which the rollers 29 put on the cutter 12 will largely govern the shape of the free end 27 of the cutter. Referring to Fig. 8 it will be seen that by tilting the machine slightly from the plane shown in Fig. 2 and feeding it at right angles to the longitudinal center line of the machine of Fig. 1, it will be possible to cut a V-shaped slot into a coal bank, which is a desirable type of cut in coal mining.

In order to draw the cuttings and fine coal dust from the slot in which the cutter 12 works, I have provided an exhaust fan 50 mounted on the shaft 14 at the bottom of the casing 10 and having a suction tube 501 which extends through a collapsible hood 51 at the front end of the casing 10 and draws the finer particles out of the slot and discharges them through the pipe 502 into some receptacle located at some other point or into the air at a point where they will not disturb the miner. A pump 52 mounted on the shaft 14 below the exhauster 50 serves to force a stream of water through the pipe 521 into the seam of coal in which the cutter 12 is working to keep down the dust and lubricate the cutter and also may serve to flow out some of the coal dust. The purpose of the fan and pump are in some respects similar and either or both may derive power from a source independent of the cutting machine.

While I have shown and described the machine in detail it will be apparent that various modifications in its construction are possible without departing from the spirit of the invention and therefore I do not wish to be limited to the exact form of machine disclosed.

Having thus described the invention, what is claimed and desired to be secured by Letters Patent is:

1. In a cutting machine the combination with an endless flexible cutter having sufficient stiffness and resiliency to tend to assume the form of a circle, of holding means for engaging a section of said cutter and holding it bent on a curve having a diameter less than said circle leaving the balance of said cutter projecting from said holding means, and means for driving the cutter.

2. In a cutting machine the combination with an endless flexible cutter having sufficient stiffness and resiliency to tend to assume the form of a circle, of holding means for engaging a section of said cutter and holding it bent on a curve having a diameter less than said circle leaving the balance of said cutter projecting from said holding means, the projecting sides of said cutter leaving the holding means at such angle to each other as to cause the projecting portion to assume an elongated loop form, and means for driving said cutter.

3. In a cutting machine the combination with an endless flexible cutter having sufficient stiffness and resiliency to tend to assume the form of a circle, of holding means for so engaging and holding a section of said cutter that the two sides of the projecting portion of said cutter are at such an angle to each other as to cause the projecting portion to assume the form of an elongated loop, and means within said holding means for driving the cutter.

4. In a cutting machine the combination with an endless flexible cutter having sufficient stiffness and resiliency to tend to assume the form of a circle, of a freely movable holding means so engaging and holding a small portion of said cutter that the two sides of the projecting portion of the cutter will leave it at such an angle to each other as to cause the projecting portion to assume the form of an elongated loop, and means for driving the cutter.

5. In a cutting machine the combination with an endless flexible cutter having sufficient stiffness and resiliency to tend to assume the form of a circle, of a casing through which said cutter passes including means so engaging the small section of said cutter within it as to make it follow a fixed path through said casing and to leave and enter said casing at such angles as to cause the projecting portion to assume the form of an elongated loop, and means in said casing for driving said cutter.

6. In a cutting machine the combination with an endless flexible cutter having sufficient stiffness and resiliency to tend to assume the form of a circle, a casing open at one side through which a section less than half of said cutter extends into said casing, a rotary shaft in said casing, means for driving said shaft, a wheel on said shaft engaging at its periphery the said section of said cutter within the casing, and guide rollers for holding said section in contact with the surface of the drive wheel and for so positioning the part of said section which is entering the casing and the part that is leaving as to make the projecting portion of the cutter assume an elongated loop form.

7. In a device of the class described, the combination with an endless bendable cutter having considerable stiffness and resiliency, of a freely movable holder engaging a section considerably less than half of said cutter and so holding it as to cause the projecting portion to assume an elongated loop form, means in said holder for preventing relative movement between said cutter and holder except longitudinal movement of the cutter, means in said holder for driving said cutter longitudinally, and flexible means for supplying power to operate said driving means.

8. In a device of the class described, the combination with an endless bendable cutter having considerable stiffness and resiliency and being provided with cutting points or teeth so arranged that any side of the cutter will operate to cut material against which it is brought, of a freely movable holder engaging a section considerably less than half of said cutter and so holding it as to cause the projecting portion to assume an elongated loop form, means in said holder for preventing relative movement between said cutter and holder except longitudinal movement of the cutter, means in said holder for driving said cutter longitudinally and flexible means for supplying power to operate said driving means.

In testimony whereof I affix my signature.

JOHN D. PUGH.

Witnesses:
JOHN R. HOOPER,
WALTER H. BILLINGSLEA.